(12) United States Patent
Son

(10) Patent No.: US 8,339,498 B2
(45) Date of Patent: Dec. 25, 2012

(54) METHOD AND APPARATUS FOR DISPLAYING LUMINANCE, AND DIGITAL PHOTOGRAPHING APPARATUS USING THE SAME

(75) Inventor: Hyuk-soo Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 620 days.

(21) Appl. No.: 12/620,661

(22) Filed: Nov. 18, 2009

(65) Prior Publication Data
US 2010/0141797 A1 Jun. 10, 2010

(30) Foreign Application Priority Data
Nov. 20, 2008 (KR) .................. 10-2008-0115805

(51) Int. Cl.
*H04N 5/222* (2006.01)
*H04N 9/68* (2006.01)
(52) U.S. Cl. ............... 348/333.02; 348/333.12; 348/235

(58) Field of Classification Search ................ None
See application file for complete search history.

(56) References Cited

U.S. PATENT DOCUMENTS

| | | | | |
|---|---|---|---|---|
| 5,150,432 A * | 9/1992 | Ueno et al. | ................. | 382/250 |
| 5,412,578 A * | 5/1995 | Takagi et al. | ................. | 700/192 |
| 5,926,251 A * | 7/1999 | Okumura | ................. | 351/209 |
| 7,804,980 B2 * | 9/2010 | Sasaki | ................. | 382/103 |
| 2004/0184673 A1 * | 9/2004 | Watanabe | ................. | 382/274 |
| 2006/0210121 A1 * | 9/2006 | Nakano et al. | ................. | 382/117 |
| 2007/0140526 A1 * | 6/2007 | Pirim | ................. | 382/103 |
| 2007/0147708 A1 * | 6/2007 | Lee | ................. | 382/298 |
| 2007/0201763 A1 * | 8/2007 | Kuwata et al. | ................. | 382/276 |
| 2009/0109310 A1 * | 4/2009 | Kobayashi et al. | ................. | 348/302 |
| 2009/0324075 A1 * | 12/2009 | Shiiyama | ................. | 382/170 |

\* cited by examiner

*Primary Examiner* — Justin P Misleh
(74) *Attorney, Agent, or Firm* — Drinker Biddle & Reath LLP

(57) ABSTRACT

Provided are a method and apparatus for displaying luminance. The method includes displaying luminance information corresponding to horizontal and vertical axes of an image. Accordingly, the total luminance of the image and luminance information on positions and regions of the image can be detected intuitively.

16 Claims, 9 Drawing Sheets

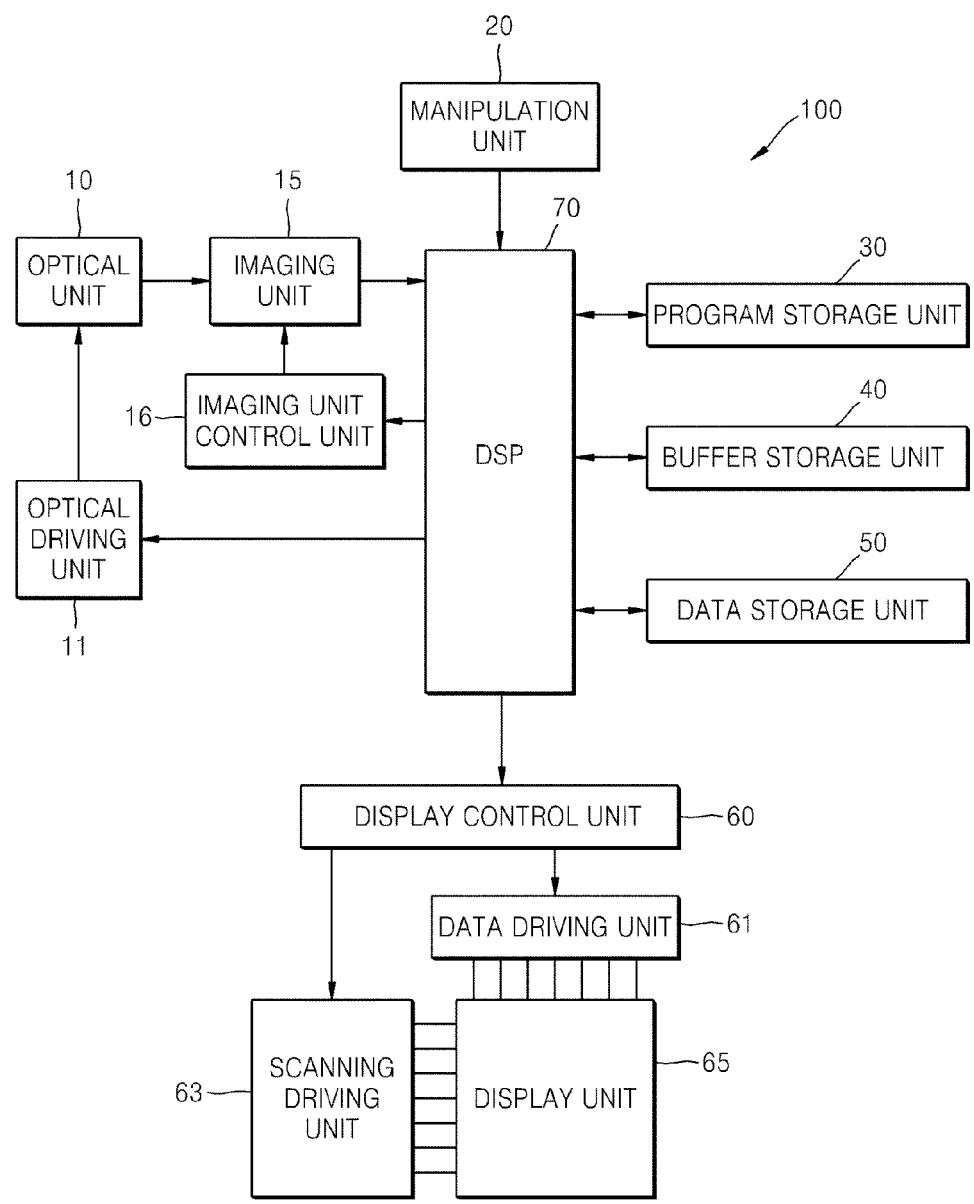

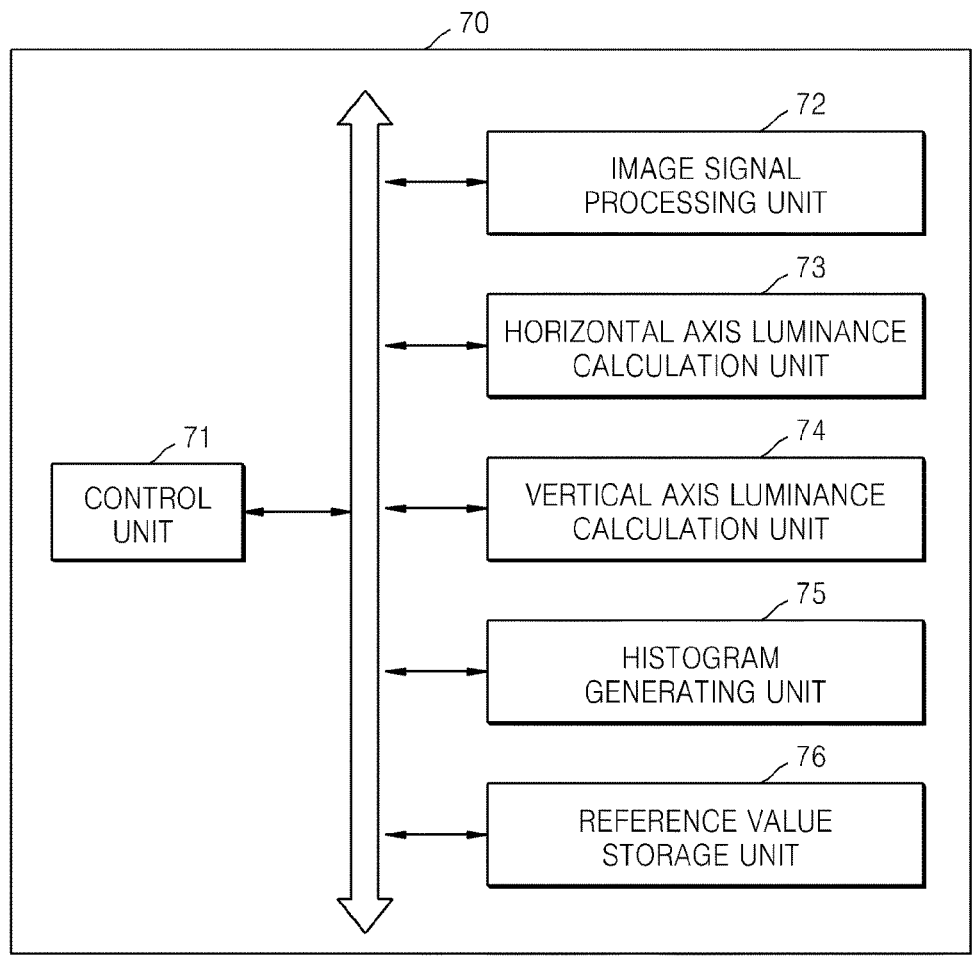

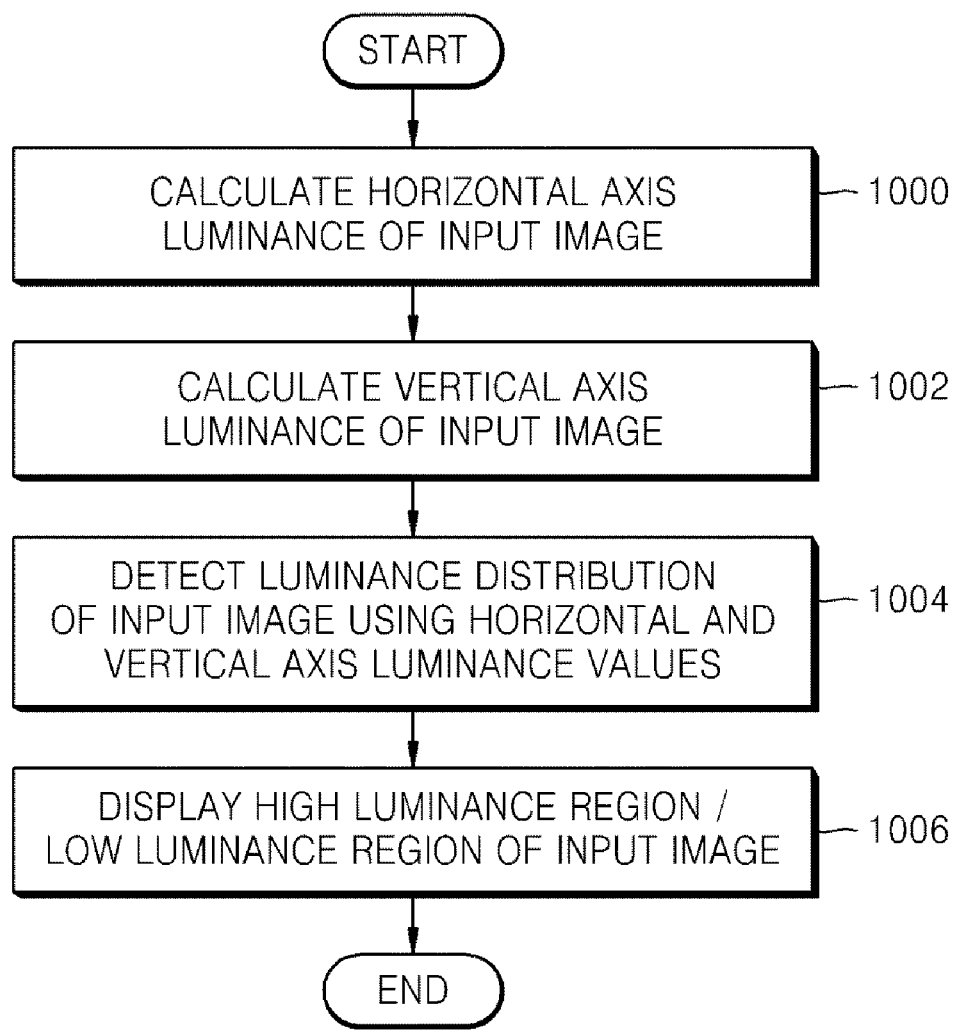

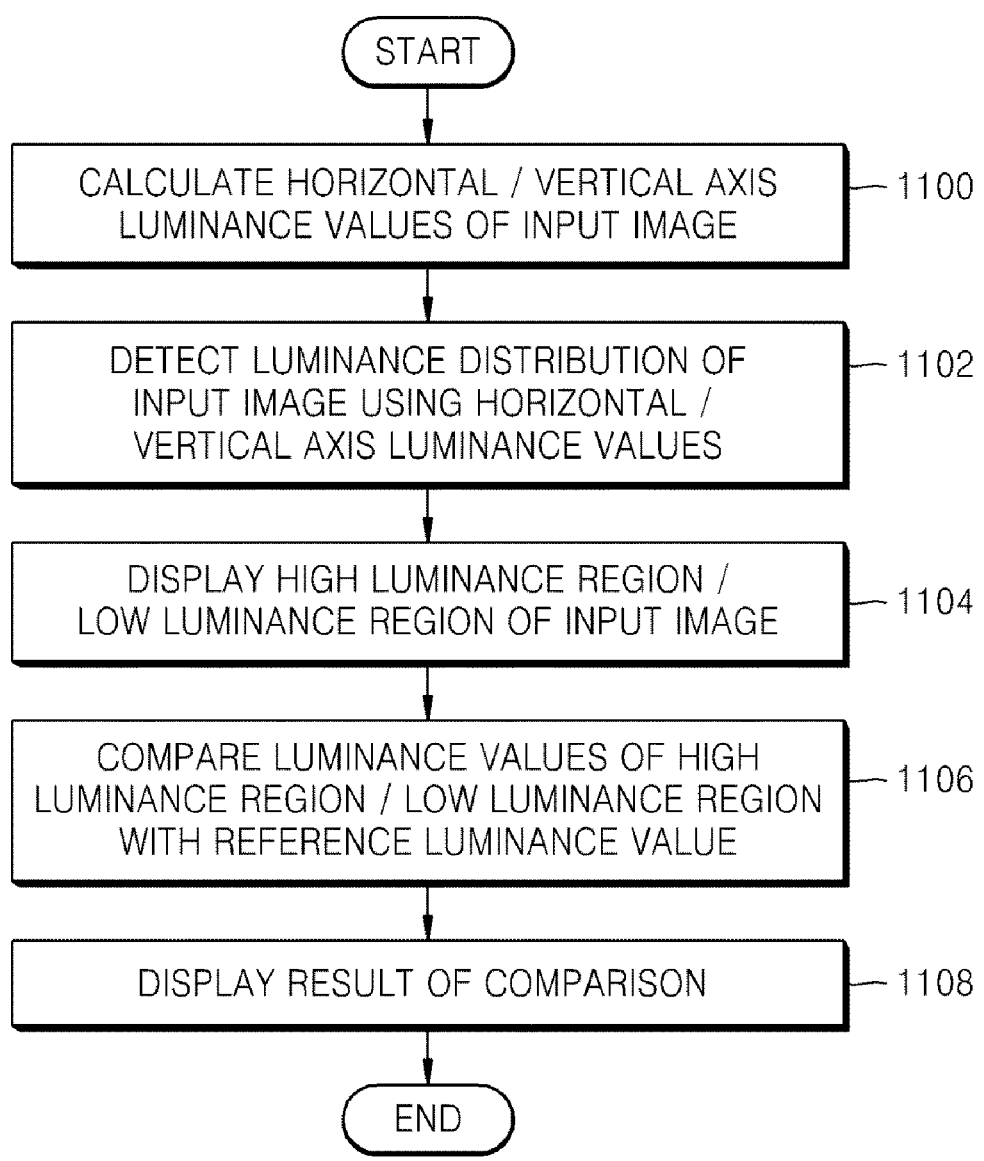

METHOD AND APPARATUS FOR DISPLAYING LUMINANCE, AND DIGITAL PHOTOGRAPHING APPARATUS USING THE SAME

CROSS-REFERENCE TO RELATED PATENT APPLICATION

This application claims the benefit of Korean Patent Application No. 10-2008-0115805, filed on Nov. 20, 2008, in the Korean Intellectual Property Office, the disclosure of which is incorporated herein in its entirety by reference.

BACKGROUND

The present invention relates to image processing, and more particularly, to a method of displaying luminance of a subject and a digital photographing apparatus using the method.

Digital photographing apparatuses such as digital cameras include a liquid crystal display (LCD) as a display unit and a user can view photographed images or images recorded in a memory card by displaying the images on the LCD. Moreover, by pushing a certain button such as a histogram button, a histogram showing luminance distribution of the subject can be displayed. The user can select exposure correction with reference to the histogram displayed on the LCD and photograph images with rich gradation even when the user is not skilled at manipulation of the digital camera.

FIGS. 1A and 1B are diagrams for explaining a conventional method of displaying luminance histograms of a subject. Referring to FIGS. 1A and 1B, in the conventional art, a histogram is displayed to display luminance information of a whole image. That is, the histogram displays the number of pixels of luminance corresponding to the whole image. Also, as illustrated in FIG. 1B, DSLR or high quality digital cameras display luminance histograms of R/G/B pixels, respectively.

Conventional histograms or RGB histograms display the screen luminance of the whole image, and thus luminance of regions or positions of the image need to be detected intuitively by the human's eyes. Also, since the luminance of the whole image is displayed using histograms, even if the background, which is not of concern to the user, is bright, and people, which are of interest to the user, are photographed dark, the total histogram of the image may be marked as being in a proper range.

SUMMARY

The present invention provides a method and apparatus for displaying luminance by displaying luminance information corresponding to horizontal and vertical lines of an image, so that luminance of the whole image and luminance information of positions or regions of the image can be intuitively detected, instead of displaying luminance information of the whole image using a histogram.

The present invention also provides a digital photographing apparatus using the method and apparatus.

According to an aspect of the present invention, there is provided a method of displaying luminance, comprising: calculating luminance values of a horizontal axis and a vertical axis of an input image based on luminance components of the input image; generating histograms of the horizontal axis and the vertical axis according to the calculated luminance values of the horizontal axis and the vertical axis; and controlling so as to display the generated histograms of the horizontal axis and the vertical axis.

The method may further comprise searching for a region where the horizontal axis and the vertical axis cross each other, among regions of the histograms of the horizontal axis and the vertical axis that have a value above and/or below a predetermined reference value, wherein the controlling comprises displaying a high luminance region and/or a low luminance region on the input image.

In the calculating, sums of values of the luminance components along the horizontal axis and the vertical axis of pixels may be calculated, respectively.

In the calculating, averages of values of the luminance components along the horizontal axis and the vertical axis may be respectively calculated with respect to pixels of the input image.

In the controlling, the high luminance region and the low luminance region may be controlled to be displayed separately.

The reference value may comprise an upper limit and/or a lower limit of a luminance level on the histograms.

In the controlling, a difference value between the reference value and the upper limit and/or the lower limit may be controlled to be displayed.

The input image may be one of a preview image of a subject to be photographed and an image to be reproduced.

According to another aspect of the present invention, there is provided a luminance display device comprising: a horizontal axis luminance calculation unit comprising algorithms for calculating luminance values of a horizontal axis based on luminance components of an input image; a vertical axis luminance calculation unit comprising algorithms for calculating luminance values of a vertical axis based on the luminance components of the input image; a histogram generating unit comprising algorithms for generating histograms of the horizontal axis and the vertical axis based on the calculated luminance values of the horizontal axis and the vertical axis; and a control unit comprising algorithms for controlling the generated histograms of the horizontal axis and the vertical axis to be displayed.

The control unit may comprise algorithms that operate so that a region where the horizontal axis and the vertical axis cross each other is searched among regions of the histograms of the horizontal axis and vertical axis that have a value above and/or below a predetermined reference value, and that a high luminance region and/or a low luminance region are displayed on the input image according to the result of the searching.

The horizontal axis luminance calculation unit and the vertical axis luminance calculation unit may respectively comprise algorithms to calculate a sum of values of the luminance components along the horizontal axis and along the vertical axis of pixels of the input image.

The horizontal axis luminance calculation unit and the vertical axis luminance calculation unit may respectively comprise algorithms to calculate an average of values of the luminance components along the horizontal axis and along the vertical axis of pixels of the input image.

The control unit may comprise algorithms that operate so as to display a high luminance region and a low luminance region separately.

The luminance display device may further comprise a reference value storage unit that store the reference value, wherein the reference value comprises an upper limit and/or a lower limit regarding a luminance level displayed on the histograms.

The control unit may comprise algorithms to operate so as to display a difference value between the reference value and the upper limit and/or the lower limit.

The input image may be one of a preview image of a subject to be photographed and an image to be reproduced.

According to another aspect of the present invention, there is provided a computer recording medium having embodied thereon a program for executing the above method.

According to another aspect of the present invention, there is provided a digital photographing apparatus comprising the luminance display device.

BRIEF DESCRIPTION OF THE DRAWINGS

The above and other features and advantages of the present invention will become more apparent by describing in detail exemplary embodiments thereof with reference to the attached drawings in which:

FIG. 2 is a block diagram of a digital apparatus according to an embodiment of the present invention;

FIG. 3 is a block diagram of a digital signal processor of the digital apparatus of FIG. 2, apparatus according to an embodiment of the present invention;

FIG. 4A is a pictorial diagram illustrating an array representing pixel luminance values;

FIG. 10 is a flowchart illustrating a method of displaying luminance, according to an embodiment of the present invention; and FIG. 11 is a flowchart illustrating a method of displaying luminance, according to another embodiment of the present invention.

DETAILED DESCRIPTION OF THE INVENTION

Figure 1A:
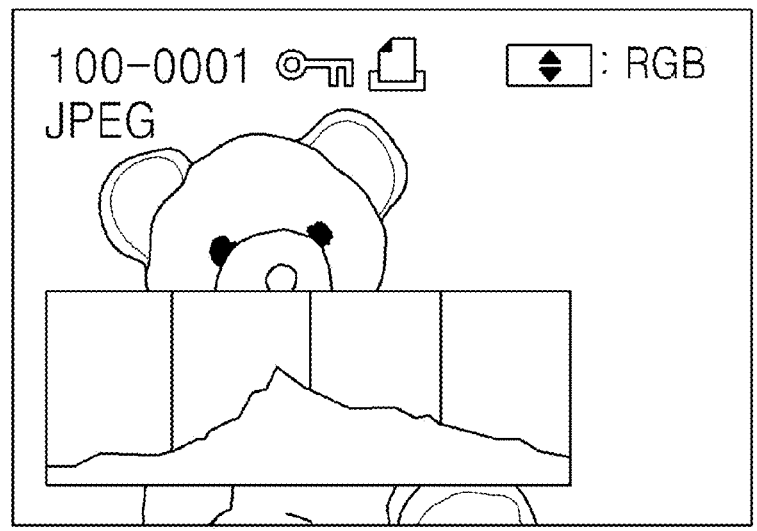
FIGS. 1A and 1B are pictorial screen-shot diagrams for explaining a conventional method of displaying luminance histograms of a subject.
Figure 1B:
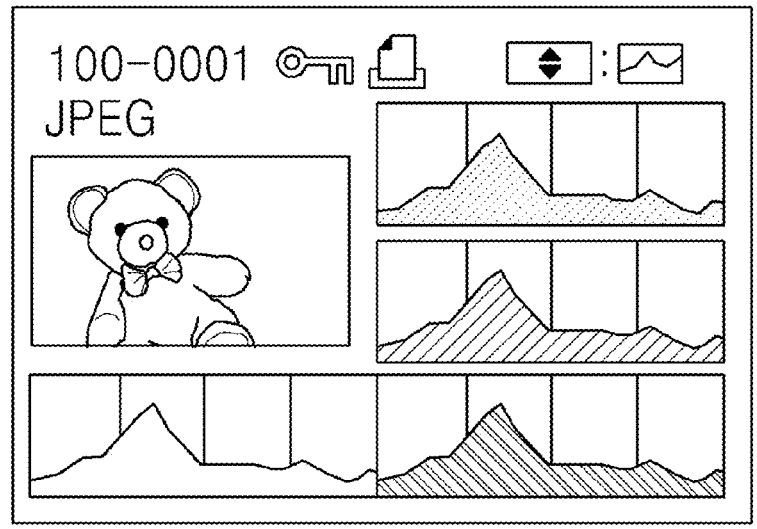

The present invention will now be described more fully with reference to the accompanying drawings, in which exemplary embodiments of the invention are shown. In the current specification, elements that are essential in understanding the operation of the present invention will be described and description of other elements will be omitted in order to prevent confusion in understanding the substance of the present invention.

The meaning of the terms used in the present specification and claims of the present invention should not be limited to be of ordinary or literary meaning but construed as meanings and concepts not departing from the spirit and scope of the invention based on the principle that the inventor is capable of defining concepts of terms in order to describe his or her invention in the most appropriate way.

FIG. 2 is a block diagram of a digital photographing apparatus 100 according to an embodiment of the present invention. FIG. 3 is a block diagram illustrating a digital signal processor (DSP) 70 of the digital photographing apparatus 100. Embodiments of the present invention are not only limited to a digital photographing apparatus described here, but may also be applied to other kinds of digital apparatuses having an image reproduction function.

Referring to FIG. 2, the digital photographing apparatus 100 according to the present embodiment includes an optical unit 10, an optical driving unit 11, an imaging unit 15, an imaging unit control unit 16, a manipulation unit 20, a program storage unit 30, a buffer storage unit 40, a data storage unit 50, a display control unit 60, a data driving unit 61, a scanning driving unit 63, a display unit 65, and the digital signal processor (DSP) 70.

The optical unit 10 receives an optical signal from a subject and provides the optical signal to the imaging unit 15. The optical unit 10 may include at least one lens such as a zoom lens that controls a view angle to be narrow or broad according to a focal length, or a focus lens that adjusts a focal point of a subject. Also, the optical unit 10 may further include an aperture that adjusts the light amount.

The optical driving unit 11 adjusts the position of a lens and the opening and closing of the aperture. Focus can be adjusted by moving the position of the lens. Also, the light amount can be adjusted by controlling the opening and closing of the aperture. The optical driving unit 11 may control the optical unit 10 according to a control signal that is automatically generated by an image signal that is input in real-time or a control signal that is input manually by the manipulation of a user.

An optical signal that has been transmitted through the optical unit 10 arrives on a light receiving surface of the imaging unit 15 and forms an image of the subject. The imaging unit 15 may be a charged coupled device (CCD) or a complementary metal oxide semiconductor image sensor (CIS) that converts an optical signal into an electric signal. Sensitivity of the imaging unit 15 may be adjusted by the imaging unit control unit 16. The imaging unit control unit 16 may also control the imaging unit 15 according to a control signal that is automatically generated by an image signal input in real-time or a control signal that is manually input according to manipulation of a user.

Control signals from the outside, for example, controls signals input by the user, may be input through the manipulation unit 20. The manipulation unit 20 may include a shutter-release button, a power button, a wide angle-zoom button, a telephoto-zoom button, and various functional buttons for inputting characters, for selecting a mode such as a photographing mode, a reproduction mode, and so forth, and for selecting white balance setup or exposure setup, etc. In the current embodiment, the user may select a histogram display for displaying a luminance histogram after displaying a preview image or a reproduction image via the manipulation unit 20. Also, according to the menu selection by the user through the manipulation unit 20, a high luminance region or a low luminance region can be displayed together with luminance histograms along the horizontal axis and the vertical axis of the image. Also, the difference between an upper limit and a lower limit of a reference luminance value may also be displayed.

The manipulation unit 20 may have various types of buttons as described above, or may be implemented in other various forms through which the user can input information, for example, a keyboard, a touch pad, a touch screen, a remote controller, and so forth.

Also, the digital photographing apparatus 100 includes the program storage unit 30 which stores programs operating the digital photographing apparatus 100 such as an operating system, an application system, etc., the buffer storage unit 40 which temporarily stores data needed for calculation or result data, and the data storage unit 50 which stores various information needed for programs such as image files including image signals.

In addition, the digital photographing apparatus 100 includes the display control unit 60 for controlling the operational state of the digital photographing apparatus 100 or image information photographed by the digital photographing apparatus 100 to be displayed, the data driving unit 61 and the scanning driving unit 63 transmitting display data received from the display control unit 60, and the display unit 65 displaying predetermined images according to a signal received from the data driving unit 61 and the scanning driving unit 63. The display unit 65 may be a liquid crystal display (LCD) panel, an organic light emitting display (OLED) panel, an electrophoretic display device (EDD), or the like.

The digital photographing apparatus 100 includes the digital signal processor (DSP) 70 which processes the received image signal and controls the components according to the processed image signal or according to an input signal from the outside.

The digital signal processor 70 will be described now with reference to FIG. 3.

Referring to FIG. 3, the digital signal processor 70 includes a control unit 71, an image signal processing unit 72, a horizontal axis luminance calculation unit 73, a vertical axis luminance calculation unit 74, a histogram generating unit 75, and a reference value storage unit 76. Hereinafter, the digital signal processor 70 and the term 'luminance display device' described in the claims should be understood to mean the same element, and thus the digital signal processor 70 operates as a luminance display device.

The control unit 71 controls the overall operations of the digital signal processor 70.

The image signal processing unit 72 converts an image signal that is received from the imaging unit 15 into a digital signal, and performs image signal processing operations such as gamma correction, color filter array interpolation, color matrix, color correction, color enhancement, etc. Also, the image signal processing unit 72 may conduct auto white balance or auto exposure algorithms if these functions are available. In addition, the image signal processing unit 72 adjusts the size of image data using a scaler, and compresses the image data to form an image file with a predetermined format. Also, the image signal processing unit 72 may decompress the compressed image file. The image signal processing unit 72 may perform image signal processing operations with respect to an image signal input in real-time in a live-view mode before photographing or an image signal that is input by a shutter-release signal. Here, different image signal processing operations may be conducted for each of the image signals.

According to an embodiment of the present invention, the image signal processing unit 72 converts a RGB image signal input through the imaging unit 15, for example, a CCD, or image data received from the data storage unit 50 into a luminance/chrominance signal, and provides the converted luminance/chrominance signal to the horizontal axis luminance calculation unit 73 and the vertical axis luminance calculation unit 74.

The horizontal axis luminance calculation unit 73 calculates a luminance value along a horizontal axis of an image based on luminance components of the image received through the image signal processing unit 72.

The vertical axis luminance calculation unit 74 calculates a luminance value along a vertical axis of an image based on luminance components of the image received through the image signal processing unit 72.

The luminance value refers to a sum of values of luminance components along the horizontal axis and along the vertical axis of pixels of the received image, or an average of the values of the luminance components. For example, in the case of 8 bit pixel data, luminance values of 0 to 255 are added up or averaged. Alternatively, the luminance values of 0 to 255 may be converted to 0 to 100 for ease of calculation.

Figure 4B:
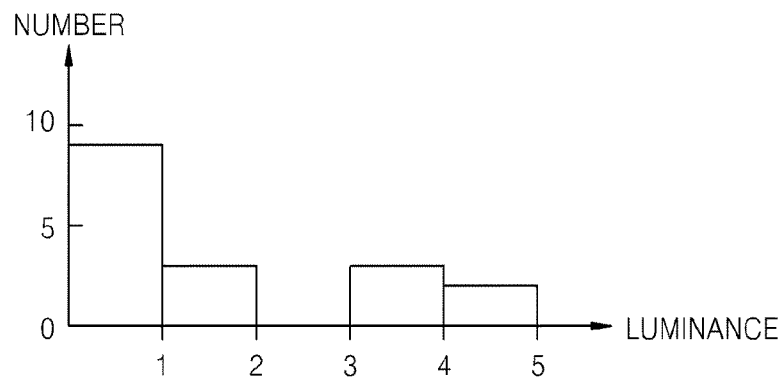
FIGS. 4B through 4D are histogram graphs for explaining a method of calculating a luminance histogram, according to another embodiment of the present invention.

Calculation of luminance values along the horizontal axis and the vertical axis will be described with reference to FIGS. 4A and 4D. FIGS. 4A through 4D are illustrative views for explaining a method of calculating luminance histograms, according to an embodiment of the present invention. FIG. 4A illustrates luminance values of pixels of a 4×4 image.

Referring to FIG. 4B, the x-axis in a conventional histogram refers to luminance, and the y-axis refers to the number of pixels of corresponding luminance of an image.

Accordingly, for example, eight pixels of the image of FIG. 4A have luminance values of 1, three pixels have luminance values of 2, no pixels have luminance values of 3, three pixels have luminance values of 4, and two pixels have luminance values of 5. Accordingly, the conventional histogram has a distribution as illustrated in FIG. 4B.

Figure 4C:
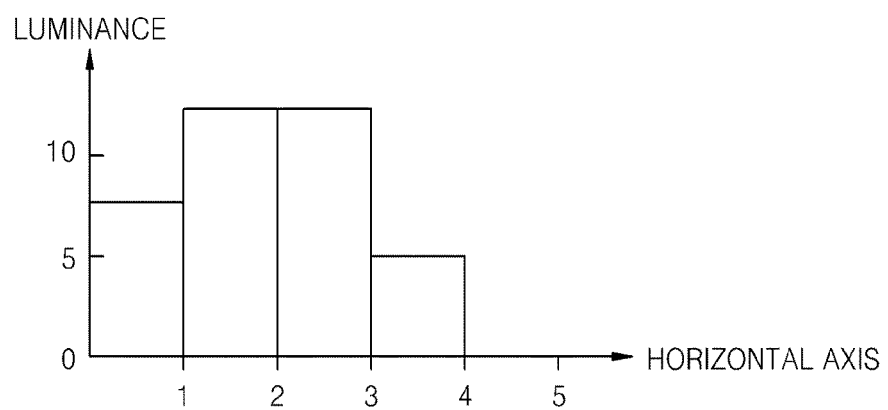
Figure 4D:
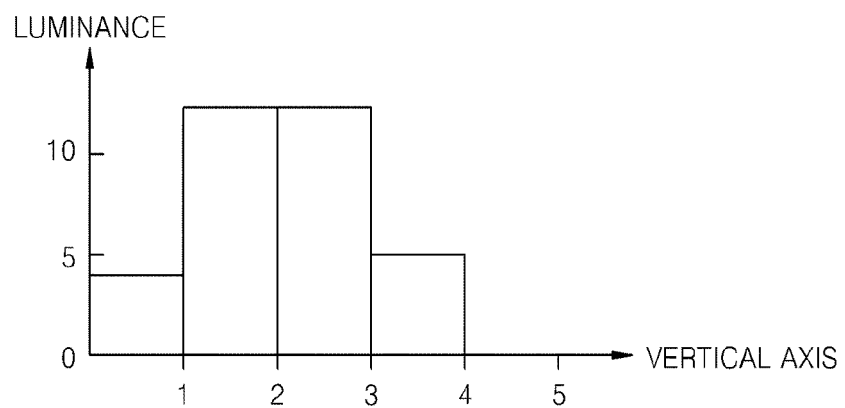

FIG. 4C is a histogram graph for explaining calculation of luminance values using the vertical axis luminance calculation unit 73 to display luminance histograms.

Referring to FIG. 4C, a histogram of luminance values along the horizontal axes of pixels of the image illustrated in FIG. 4A is illustrated. The x-axis denotes positions of pixels along the horizontal axis, and the y-axis denotes luminance. In FIG. 4C, the total luminance of the first horizontal axis is 8, that of the second horizontal axis is 12, that of the third horizontal axis is 12, and that of the fourth horizontal axis is 5.

Referring to FIG. 4D, a histogram of luminance values is illustrated, wherein the y-axis refers to luminance values of pixels of the image illustrated in FIG. 4A. The x-axis refers to positions of the pixels along the vertical axis, and the y-axis denotes luminance. The total of luminance values of the first vertical axis is 4, that of the second vertical axis is 13, that of the third vertical axis is 13, and that of the fourth vertical axis is 6.

As described above, the horizontal axis luminance calculation unit 73 and the vertical axis luminance calculation unit 74 calculate luminance values of pixels of the input image, along the horizontal axis and the vertical axis, respectively. Here, the luminance values are calculated based on pixel units, but may also be calculated based on block units, which are sets of pixels. Also, an average luminance of the pixels may be calculated instead of the total luminance of the pixels. Although here the horizontal axis luminance calculation unit 73 and the vertical axis luminance calculation unit 74 are described separately, an integrated luminance calculation unit may also calculate luminance of the horizontal axis and the vertical axis. Also, instead of calculating the sum or the average of the luminance along the horizontal axis and the vertical axis of an image, a sum or an average of luminance of a certain axis, that is, one of the horizontal axis and the vertical axis may be calculated and a histogram of the horizontal axis or the vertical axis may be generated to display only one histogram of the one axis.

The histogram generating unit 75 generates histograms of the horizontal axis and the vertical axis according to the calculated luminance values of the horizontal axis and the vertical axis by the horizontal axis luminance calculation unit 73 and the vertical axis luminance calculation unit 74. The control unit 71 controls the histograms of the horizontal axis and the vertical axis generated by the histogram generating unit 75 to be displayed on the display unit 65.

Figure 5A:
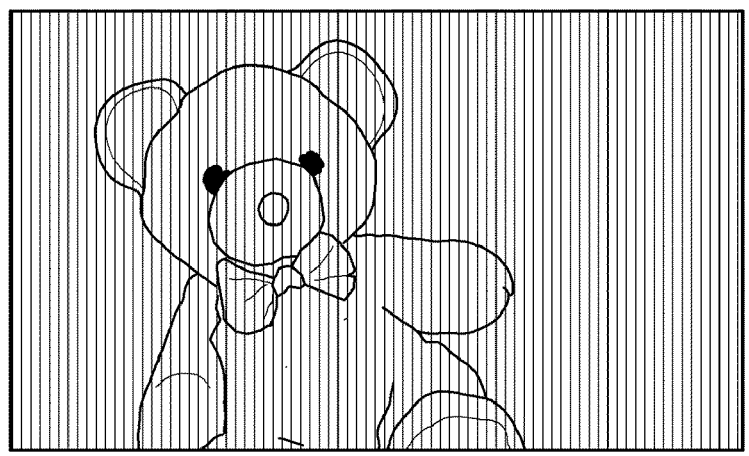
FIGS. 5A through 5C are pictorial views for explaining a method of displaying a luminance histogram of a subject, according to another embodiment of the present invention.
Figure 5B:
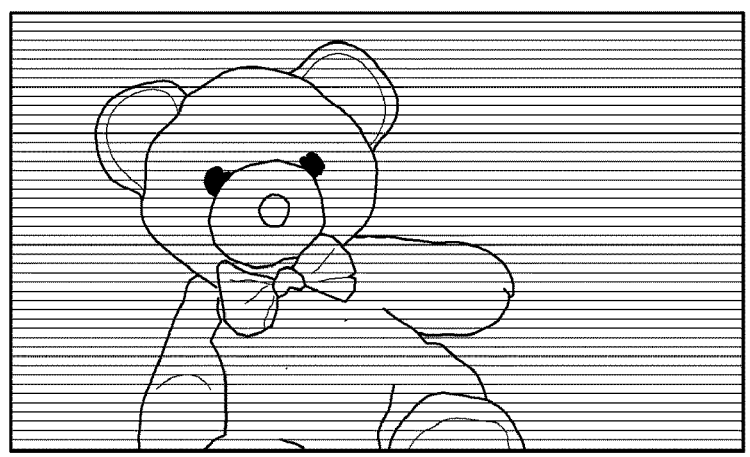
Figure 5C:
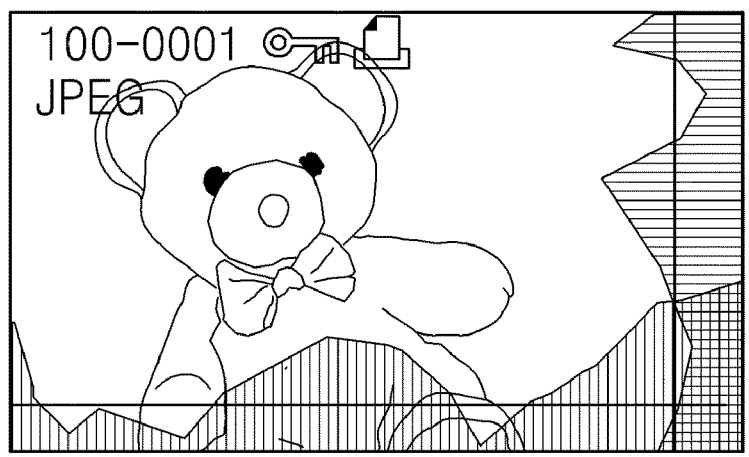

FIGS. 5A through 5C are pictorial views for explaining a method of calculating luminance values of the horizontal and vertical axes of an image and displaying luminance histograms of a subject, according to another embodiment of the present invention. As illustrated in FIGS. 5A and 5B, luminance values along the horizontal axis and the vertical axis are calculated, and as illustrated in FIG. 5C, the calculated luminance values are formed as histograms and displayed on a lower part and a right side of a display screen. Also, calculation of the luminance along the horizontal axis as illustrated in FIG. 5A or calculation of the luminance along the vertical axis as illustrated in FIG. 5B may be performed selectively to generate a histogram of one of the calculations and display the histogram with the input image or separately from the input image.

Figure 6:
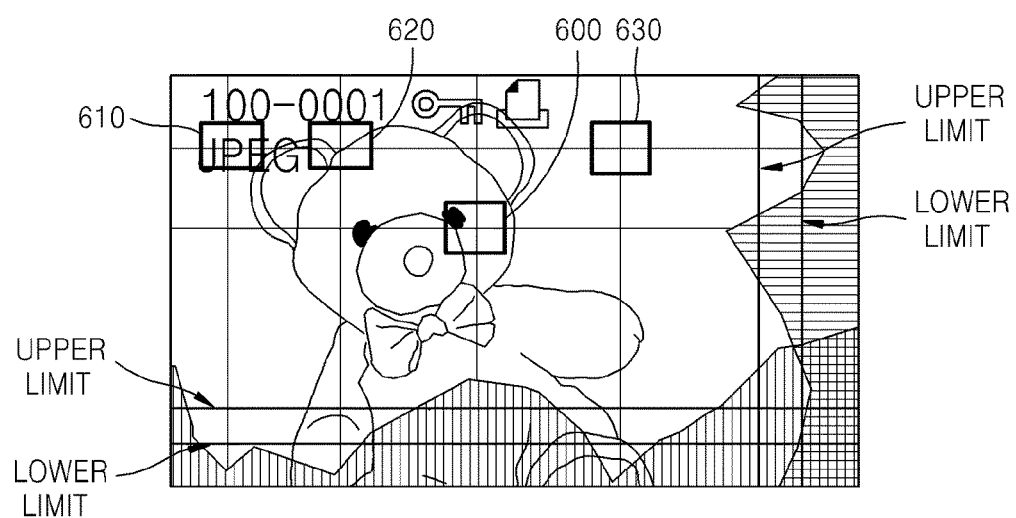
FIG. 6 is a pictorial diagram for explaining a method of displaying luminance, according to another embodiment of the present invention.

The control unit 71 searches for crossing regions where the horizontal axis histogram on the lower part of the display screen and the vertical axis histogram on the right end of the display screen cross each other among regions of a value above a predetermined reference value and regions of a value below the predetermined reference value. The searching operation is illustrated in FIG. 6. Also, the control unit 71 controls a high luminance region and a low luminance region to be displayed in the input image according to the search result.

FIG. 6 illustrates an example of displaying luminance according to another embodiment of the present invention. Referring to FIG. 6, a crossing region 600 where regions above the upper limit in the horizontal axis luminance histogram on the lower part of the display screen and regions above the upper limit in the vertical axis histogram on the right end of the display screen cross one another along the vertical axis and along the horizontal axis is searched. Also, crossing regions 610, 620, and 630 where regions below the lower limit in the horizontal axis luminance histogram on the lower part of the display screen and regions below the lower limit in the vertical axis histogram on the right end of the display screen cross one another along the vertical axis and along the horizontal axis are searched. The upper limit and the lower limit are references for determining a range of luminance levels and may be determined as desired.

The reference value storage unit 76 includes a reference value for an appropriate luminance level, and the reference value includes an upper limit of the appropriate luminance level and a lower limit of the appropriate luminance level. The upper limit and the lower limit may preferably be determined differently for the type of photographing modes such as a portrait mode, a scene mode, a night view mode, etc. and may be set according to the selection of the user.

Figure 7:
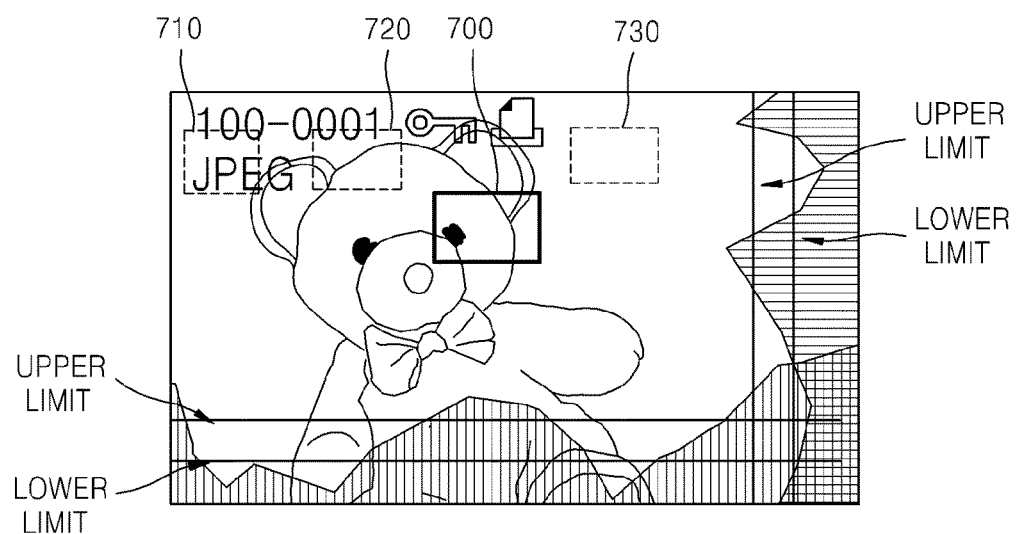
FIG. 7 is a pictorial diagram illustrating a method of displaying luminance, according to another embodiment of the present invention.

FIG. 7 is a pictorial diagram for explaining a method of displaying luminance, according to another embodiment of the present invention. Referring to FIG. 7, the control unit 71 controls the displaying of a crossing region 700 denoted with a solid line as a high luminance region and crossing regions 710, 720, and 730 denoted with a dotted line as a low luminance region.

Figure 8:
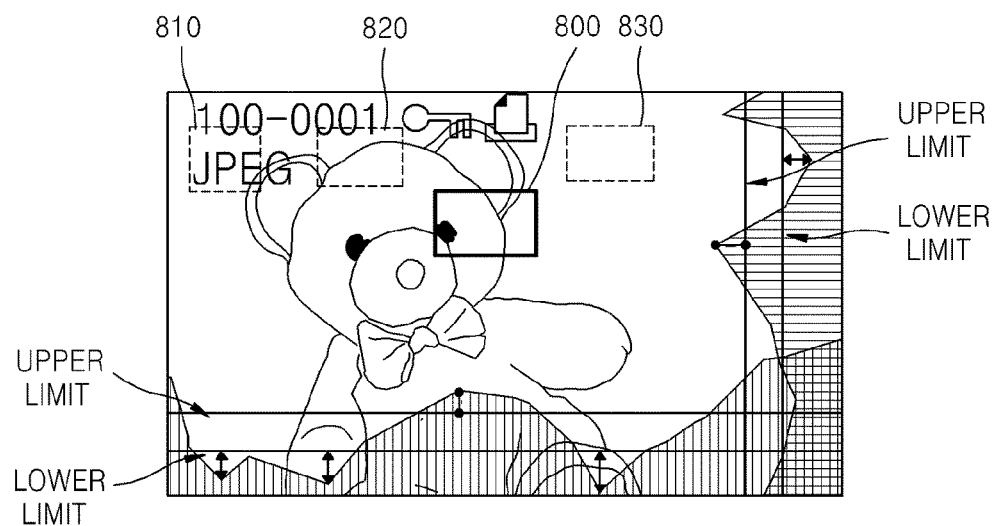
FIG. 8 is a pictorial diagram for explaining a method of displaying luminance, according to another embodiment of the present invention.

FIG. 8 is a pictorial diagram for explaining a method of displaying luminance, according to another embodiment of the present invention. Referring to FIG. 8, the control unit 71 controls the displaying of a crossing region 800 denoted with a solid line as a high luminance region, and crossing regions 810, 820, and 830 denoted with a dotted line as a low luminance region, and the displaying of the difference between the upper limit and the lower limit, which are the standard values, so that the user can intuitively recognize how much difference there is.

Figure 9:
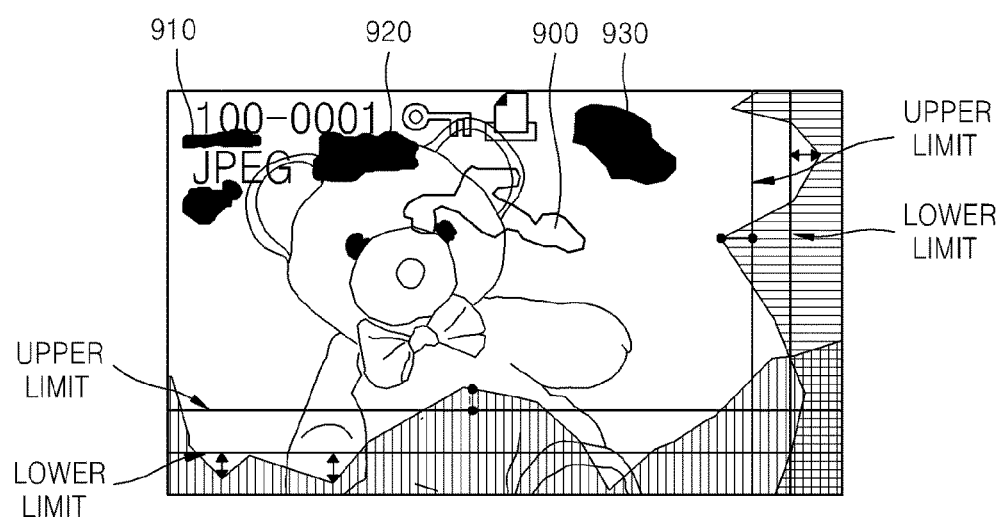
FIG. 9 is a pictorial diagram for explaining a method of displaying luminance, according to another embodiment of the present invention.

FIG. 9 is a pictorial diagram for explaining a method of displaying luminance, according to another embodiment of the present invention. Referring to FIG. 9, a high luminance region 900 and low luminance regions 910, 920, and 930 may be displayed with a white color and a black color, respectively.

FIG. 10 is a flowchart illustrating a method of displaying luminance, according to an embodiment of the present invention. Referring to FIG. 10, in operation 1000, horizontal axis luminance values of an input image are calculated. In operation 1002, vertical axis luminance values of the input image are calculated. Operations 1000 and 1002 may be conducted at the same time or in the reverse order. That is, the order is not limited.

In operation 1004, luminance distribution of the input image is searched using the horizontal axis luminance values and the vertical axis luminance values. That is, histograms of the horizontal axis and the vertical axis are generated according to the calculated luminance values along the horizontal axis and the vertical axis, and regions where the horizontal axis histograms and the vertical axis histograms cross each other are searched to detect luminance distribution of the input image.

In operation 1006, a high luminance region and a low luminance region of the input image are displayed. The high luminance region and the low luminance region can be displayed separately.

FIG. 11 is a flowchart illustrating a method of displaying luminance, according to another embodiment of the present invention.

Referring to FIG. 11, in operation 1100, horizontal and vertical axis luminance values of an input image are calculated. In operation 1102, luminance distribution of the input image is searched using the horizontal and vertical axis luminance values. In operation 1104, a high luminance region and a low luminance region of the input image are displayed. In operation 1106, the luminance values of the high and low luminance regions and a reference luminance value are compared, and in operation 1108, the result of comparison is displayed. In other words, the difference between a reference value indicating an appropriate luminance range and the luminance of the high luminance region and the luminance value of the low luminance region is displayed, and thus the user can intuitively recognize the current luminance distribution and the degree of the luminance.

According to the luminance displaying method, luminance information corresponding to horizontal and vertical axes of an image is displayed on the screen and thus the luminance of the whole image and luminance information on positions or regions of the image can be recognized intuitively.

While the embodiments of the present invention have been described with reference to a digital camera as an example of a digital photographing apparatus, the present invention is not limited thereto. That is, the present invention may also be applied to a mobile phone having a function of a camera, a personal digital assistant (PDA), a portable multimedia player (PMP), and so forth.

The present invention may be realized as computer readable codes in a computer readable recording medium. Examples of the computer readable recording medium include various kinds of recoding media that store computer system readable data.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A method of displaying luminance on a display screen, comprising:
    displaying an image having a horizontal axis and a vertical axis;
    calculating luminance values based on luminance components of each of the image horizontal axis and the image vertical axis;
    generating histograms of the horizontal axis and the vertical axis according to the calculated luminance values of the horizontal axis and the vertical axis;
    controlling the display screen to display the generated histograms of the horizontal axis and the vertical axis; and
    searching for a region where the horizontal axis and the vertical axis cross each other among regions of the histograms of the horizontal axis and the vertical axis that have a value that is at least one of above and below a predetermined reference value,
    wherein the controlling comprises displaying at least one of a high luminance region and a low luminance region on the input image.

2. The method of claim 1, further comprising in the calculating:
    calculating sums of values of the luminance components along the horizontal axis and the vertical axis of pixels, respectively.

3. The method of claim 1, further comprising in the calculating:
    respectively calculating averages of values of the luminance components along the horizontal axis and the vertical axis with respect to pixels of the input image.

4. The method of claim 1, further comprising in the controlling:
    separately displaying the high luminance region and the low luminance region.

5. The method of claim 1, wherein the reference value comprises at least one of an upper limit and a lower limit of a luminance level on the histograms.

6. The method of claim 5, further comprising in the controlling:
    displaying a difference value between the reference value and at least one of the upper limit and the lower limit.

7. The method of claim 1, wherein the input image is one of a preview image of a subject to be photographed and an image to be reproduced.

8. A non-transitory computer recording medium having embodied thereon a program for executing the method of claim 1.

9. A luminance display device comprising:
- an image display device that displays an image having a horizontal axis and a vertical axis;
- a horizontal axis luminance calculation unit for calculating luminance values of the horizontal axis based on luminance components of an input image;
- a vertical axis luminance calculation unit for calculating luminance values of the vertical axis based on the luminance components of the input image;
- a histogram generating unit for generating histograms of the horizontal axis and the vertical axis based on the calculated luminance values of the horizontal axis and the vertical axis; and
- a control unit controlling the generated histograms of the horizontal axis and the vertical axis to be displayed;
- wherein the control unit controls such that a region where the horizontal axis and the vertical axis cross each other is searched among regions of the histograms of the horizontal axis and vertical axis that have a value that is at least one of above and below a predetermined reference value, and that at least one of a high luminance region and a low luminance region are displayed on the input image according to the result of the searching.

10. The luminance display device of claim 9, wherein the horizontal axis luminance calculation unit and the vertical axis luminance calculation unit comprise algorithms for respectively calculating a sum of values of the luminance components along the horizontal axis and along the vertical axis of pixels of the input image.

11. The luminance display device of claim 9, wherein the horizontal axis luminance calculation unit and the vertical axis luminance calculation unit respectively comprise algorithms for calculating an average of values of the luminance components along the horizontal axis and along the vertical axis of pixels of the input image.

12. The luminance display device of claim 9, wherein the control unit controls so as to display a high luminance region and a low luminance region separately.

13. The luminance display device of claim 9, further comprising a reference value storage unit that stores the reference value,
wherein the reference value comprises at least one of an upper limit and a lower limit regarding a luminance level displayed on the histograms.

14. The luminance display device of claim 13, wherein the control unit comprises an algorithm that displays a difference value between the reference value and at least one of the upper limit and the lower limit.

15. The luminance display device of claim 9, wherein the input image is one of a preview image of a subject to be photographed and an image to be reproduced.

16. A digital photographing apparatus comprising the luminance display device of claim 9.

* * * * *